US006369560B1

(12) United States Patent
Nghiem et al.

(10) Patent No.: US 6,369,560 B1
(45) Date of Patent: Apr. 9, 2002

(54) HANDLEABLE WORKING DEVICE, IN PARTICULAR PRESSING DEVICE

(75) Inventors: Xuan Luong Nghiem, Krefeld; Arnd Greding, Mulheim/Ruhr, both of (DE)

(73) Assignee: Novopress GmbH Pressen und Presswerkzeuge & Co., KG (DE)

( * ) Notice: Subject to any disclaimer, the term of this patent is extended or adjusted under 35 U.S.C. 154(b) by 0 days.

(21) Appl. No.: 09/640,977

(22) Filed: Aug. 17, 2000

(30) Foreign Application Priority Data

Aug. 17, 1999 (DE) ........................................ 199 38 968

(51) Int. Cl.[7] ............................... G05F 1/40; H02J 7/00

(52) U.S. Cl. ........................ 323/284; 320/136; 388/921

(58) Field of Search ................................ 323/284, 282, 323/283, 285, 286; 320/140, DIG. 21, 141, 136, 152; 340/636; 318/599, 838; 388/823, 829, 831, 921; 307/139, 136, 140, 126

(56) References Cited

U.S. PATENT DOCUMENTS

| | | | | |
|---|---|---|---|---|
| 4,153,867 A | * | 5/1979 | Jungfer et al. | 320/158 |
| 4,320,334 A | * | 3/1982 | Davis et al. | 320/48 |
| 5,657,417 A | * | 8/1997 | Di Troia | 388/829 |
| 5,773,977 A | | 6/1998 | Dougherty | |

FOREIGN PATENT DOCUMENTS

| | | |
|---|---|---|
| DE | 2610536 | 4/1977 |
| DE | 3942288 | 3/1991 |
| DE | 19517709 | 11/1996 |
| EP | 0676835 | 10/1995 |
| EP | 0627273 | 1/1999 |

* cited by examiner

*Primary Examiner*—Rajnikant B. Patel
(74) *Attorney, Agent, or Firm*—Liniak, Berenato, Longacre & White, LLCX

(57) ABSTRACT

A pressing device includes a pressing tool, an electric motor for driving the tool, and a rechargeable battery for supplying energy to the electric motor. A control device has a voltage comparison element that performs a voltage comparison between the battery voltage and a limit voltage. The control device generates an attention signal and/or limits activation of the electric motor if the voltage comparison element indicates that the battery voltage is equal to or less than the limit voltage. The control device includes an interval element with at least one storable interval. A load element acts upon the battery so that it generates a varying voltage curve. The interval element is activated when the load element is on and voltage comparison is made during a predetermined interval.

25 Claims, 4 Drawing Sheets

HANDLEABLE WORKING DEVICE, IN PARTICULAR PRESSING DEVICE

FIELD OF THE INVENTION

The invention concerns a handleable working device, in particular a pressing device, having a tool, in particular a pressing tool; an electric motor for driving the tool; a battery, in particular rechargeable, for supplying energy to the electric motor; and having a control device which has a voltage comparison element that performs a voltage comparison between the present battery voltage and a limit voltage, such that the control device generates an attention signal and/or limits activation of the electric motor so as to spare the battery if the voltage comparison indicates that the present battery voltage is equal to or less than the limit voltage.

DESCRIPTION OF THE RELATED ART

For assembly purposes or for processing purposes, handleable working devices that substantially comprise a tool and an electric motor for driving the tool are known. For joining pipes, for example, pressing devices are used with which a press fitting, which is slid over the pipe ends in order to create the pipe join, is radially compressed. Pressing devices of this kind are known, for example, from EP-A-0 627 273. Handleable working devices of fundamentally the same design, as is evident for example from EP-A-0 676 835, are also used to install cable lugs onto cable ends. The electric motor need not act directly on the tool. Its energy can also be converted into a hydraulic drive system which then acts on the tool.

As EP-A-0 676 835 further shows, energy can also be supplied to the electric motor via a replaceable and also rechargeable battery, so that the working device can be used even in places where no electrical power system exists. With such battery-driven devices, it is important to know whether the energy content still available in the battery is sufficient to perform a further operation (in the case of a pressing tool, a further pressing cycle). In modem batteries based on nickel-cadmium or nickel-metal hydride, the residual energy content is difficult to observe, since these batteries have a characteristic curve with an almost constant voltage level over a long period, the voltage decreasing relatively steeply only toward the end. The result of this can be that one working cycle still proceeds entirely normally, while the subsequent working cycle cannot be completed because the battery is discharged.

In EP-A-0 676 835, it is proposed to equip the working device—in this case a cable lug crimping device—with a voltage measurement device to sense the particular battery voltage, and with a voltage comparison element having at least one memory for at least one limit voltage. The voltage comparison element is activated before the electric motor is switched on, and performs a voltage comparison between the present battery voltage and the limit voltage. If the voltage comparison indicates that the present battery voltage is equal to or less than the limit voltage, the electric motor is not started. At the same time, a visual indication is given. EP-A-0 676 835 contains no information as to how the battery voltage is measured.

BRIEF SUMMARY OF THE INVENTION

It is the object of the invention to configure a working device of the kind cited initially in such a way that working cycles are started only if sufficient battery capacity is still present for the working cycle in question.

According to the present invention, this object is achieved in that the control device has an interval element with at least one stored interval; and that a load element is present by way of which the battery can be acted upon by a load cycle that generates a voltage curve with a varying battery voltage, the interval element being activated at least once after the load element is switched on, and the voltage comparison being performed within the interval.

The basic idea of the invention is consequently to act upon the battery with a load cycle that generates a voltage curve with a changing battery voltage, and then to perform the voltage comparison within at least one interval having a characteristic voltage curve. If the voltage remains below a limit voltage within the interval, an attention signal is generated, for example an electrical or audible alarm, and/or activation of the electric motor is limited or the electric motor is immediately inhibited, so that complete discharge of the battery does not occur.

The load element can be the electric motor itself, i.e. in this case the electric motor is switched on, and the voltage comparison is performed within at least one interval having a characteristic voltage curve. The load element can instead also be an adjustable resistor in the form of a potentiometer, with which the load cycle is generated. This version is advantageous if the battery is separate from the working device and is joined to it only via a cable. In this case the charge state of the battery can be checked independently of the working device and thus also without any connection to it, if the corresponding circuit is arranged in the housing for the battery. The two types of circuit can, however, also be combined with one another, by the fact that the resistor is arranged electrically in parallel with the electric motor and by way of a two-way switch either the resistor or the electric motor is selectably switched in as the load element.

In a particularly advantageous embodiment of the invention, it is proposed that the is voltage comparison element be configured as an analog comparator to which the battery voltage on the one hand and the limit voltage on the other hand are applied. The limit voltage can be generated by an auxiliary battery. The comparator switches logic states if the present battery voltage either exceeds or falls below the limit voltage. The circuit described above requires no current measurement system or parts that define current measurements, and is thus notable for its simplicity. In the case in which the load element is the electric motor itself, the voltage comparison places no load on the battery.

The interval element is preferably configured as a timing element. The interval can instead also be defined in a different manner, for example by sensing a specific number of revolutions of the electric motor or the like.

In one embodiment, the interval element is activated as the load element is switched on, i.e. the interval begins with actuation of the load element. Alternatively, there also exists the possibility that the voltage comparison element performs a voltage comparison after the load element is switched on, and the interval element is activated only when it is determined that the present battery voltage has reached, or falls below or exceeds, a second limit voltage. In this context, the first and the second limit voltage are preferably identical.

The load element should produce a start-up phase with a voltage drop, and then a subsequent voltage recovery, as is the case in most situations (in particular with pressing devices) when the electric motor is the load element. The voltage drop results from the high current consumption caused by the fact that the parts driven by the electric motor must be accelerated to its idle speed. In this case the interval element should be activated in such a way that the interval lies within the start-up phase.

If the interval lies within a phase of a very pronounced voltage change, for example within the start-up phase described above, the activation of one interval is sufficient to obtain a reliable indication as to the charge state of the battery and to take countermeasures if the risk exists that the battery charge is no longer sufficient for the present or future load cycle. An improvement can be achieved in this context, however, by the fact that the interval element is activated more than once, at separate times, within the load cycle; here again, it is advantageous to activate the interval element only in regions of the load cycle where a voltage drop and a subsequent voltage recovery take place. Alternatively, however, provision can be made for the intervals to be directly adjacent to one another at least over a portion of the load cycle, preferably over the entire load cycle, so that a continuous voltage comparison as defined above takes place. Both versions are advisable in particular when different limit voltages are associated with the intervals, so that the voltage curve can be tracked and analyzed even with greatly fluctuating voltages. If a comparator is used for the voltage comparison element, provision can be made to apply to the comparator different limit voltages that are switched in alternatingly. An adjusting element with which the limit voltage supplied for each interval can be set differently can also, however, be present. It is understood that this is accomplished by way of a corresponding circuit before the interval or as it begins.

Regardless of whether only one interval or several intervals is or are activated for the voltage comparison, provision is furthermore made according to the invention for the limit voltage(s) to be modifiable, for example in order to adapt it/them to altered conditions such as temperature or aging of the moving parts of the working device. A temperature measurement device can be provided, for example, such that the lower the temperature, the higher the setting, within a design temperature range, of the limit voltage associated with the respective interval and/or the shorter the length of the interval or intervals. This takes into account the circumstance that the energy content of a battery is less at lower operating temperatures than at higher temperatures. In addition, provision should be made for the limit voltage(s) to be elevated, by the action of the temperature measurement device, if the temperature sensed by the temperature measurement device lies above or below the design temperature range. If the limit voltage(s) is or are sufficiently high, this prevents the working device from being put into service at temperatures that are damaging to the battery. It is particularly advantageous if the temperature measurement device directly measures the temperature of the battery, since in this fashion it is possible to take into consideration the heating of the battery immediately once the electric motor is started, so that the limit voltage(s) can be decreased.

In a further embodiment of the invention, provision is made that in one load cycle, at least one present battery voltage is stored; and that a comparison is made, in a load cycle subsequent thereto, between the previously stored battery voltage and the present battery voltage in the same phase of the load cycle, a higher limit value or higher limit values being utilized, and/or the length of the interval or intervals being shortened, if the present battery voltage is lower than the stored voltage. This makes it possible to take into account gradual changes, especially those due to aging processes, so that even in such cases it is possible reliably to prevent the working device from being put into service if the charge state of the battery no longer allows for further working cycles. The comparison should preferably be made in a phase of constant load generation by the load element, since the gradual changes are most easily detectable there.

Provision is furthermore made according to the invention for the tool to be returned to the starting position by the electric motor if the voltage comparison indicates that the present battery voltage is equal to or less than the limit voltage. The remaining charge in the battery is thus used to reach the starting position and thus to release the workpiece. This type of utilization of the remaining energy also occurs if a visible or audible indication is given. In addition, the electric motor should be shut off, immediately or after the tool has returned to the starting position (and in fact inhibited in the latter case), if the voltage comparison indicates that the present battery voltage is equal to or less than the limit voltage.

Alternatively, provision can be made for the load cycle to be carried to completion if the voltage comparison indicates that the present battery voltage is equal to or less than the limit voltage, and for the electric motor to be inhibited until the battery is replaced. Provision can also be made, however, for the electric motor to be inhibited only after a limited number of load cycles, until the battery is replaced.

BRIEF DESCRIPTION OF THE SEVERAL VIEWS OF THE DRAWINGS

The invention is illustrated in more detail, with reference to exemplary embodiments, in the drawings, in which.

DETAILED DESCRIPTION OF THE INVENTION

Figure 2:
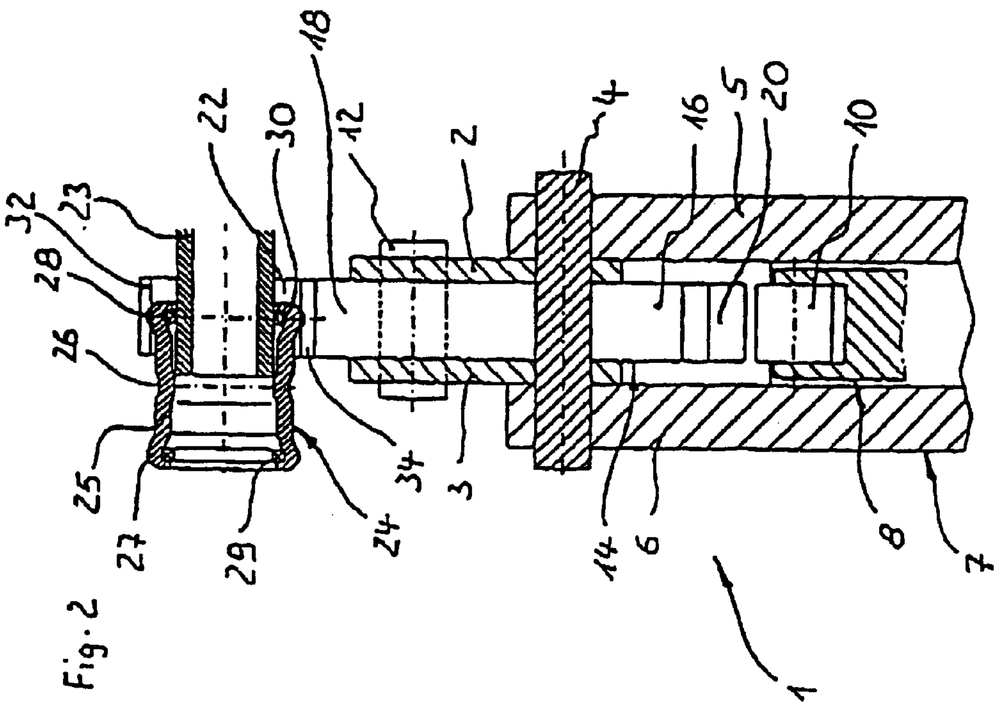
FIG. 2 shows a cross section through the pressing device of FIG. 1 in plane A—A.
Figure 1:
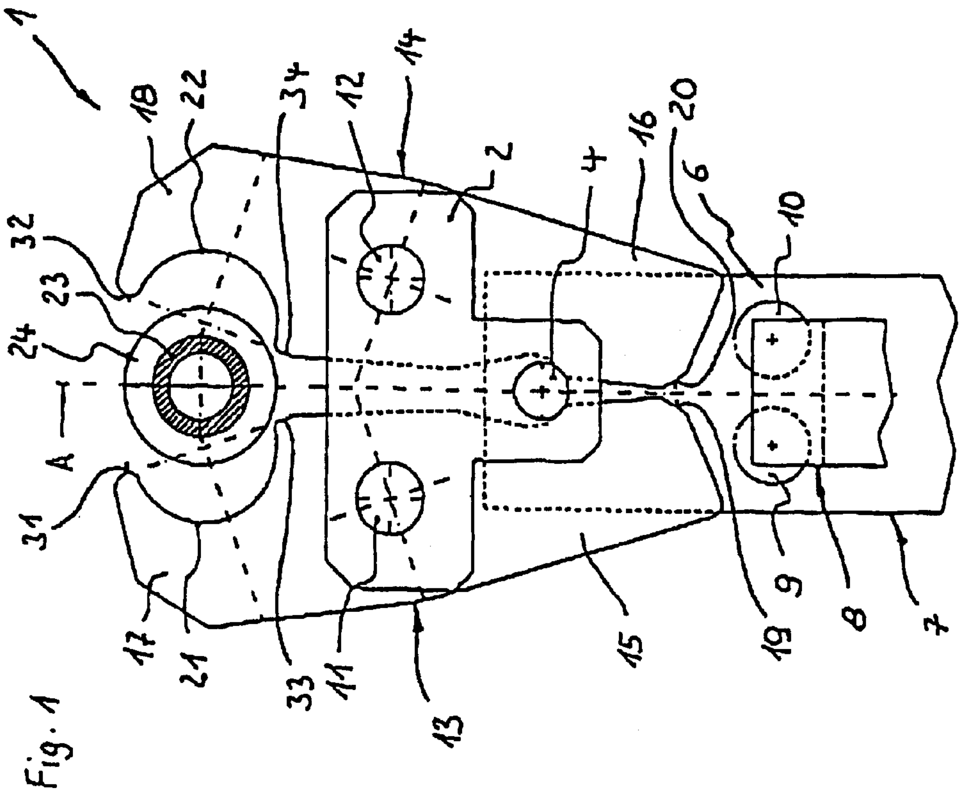
FIG. 1 shows a pressing device in a front view, with press fitting and pipe end, in the open position.

The pressing device depicted in FIGS. 1 and 2 has two T-shaped bearing plates 2, 3 that, when seen in the front view as shown in FIG. 1, are arranged exactly one behind another. In the lower part, bearing plates 2, 3 are penetrated by a connecting pin 4. Placed on this connecting pin 4 from both sides are support plates 5, 6 (the front one of which is omitted in FIG. 1) which belong to the drive system labeled 7 in its entirety. Only their upper regions are depicted. Arranged at their lower ends is an electric motor which drives a spindle. The upper end of the spindle is equipped with a drive head 8 that is configured at the top in a fork shape. Inside drive head 8, two drive rollers 9, 10 are mounted next to one another in a manner freely rotatable about a horizontal axis. Drive head 8 can be moved vertically back and forth by way of the electric motor. Connecting pin 4 is configured removably, so that the entire drive system 7 can easily be taken out.

In the upper region, bearing plates 2, 3 are penetrated by bearing pins 11, 12 arranged spaced apart next to one another. On each of bearing pins 11, 12, a pivot lever 13, 14 is mounted between bearing plates 2, 3. The two pivot levers 13, 14 are of mirror-symmetrical configuration and form the pressing tool. They have drive arms 15, 16 proceeding downward from bearing pins 11, 12, and jaw arms 17, 18 proceeding upward. Drive arms 15, 16 have drive surfaces 19, 20 that initially are inclined only slightly from the horizontal and then transition into a region oriented steeply upward. Semicircular recesses which form the contour of pressing jaws 21, 22 are shaped into the mutually opposite sides of jaw arms 17, 18.

FIGS. 1 and 2 show pressing device 1 in the open position, in which drive head 8 occupies its lowest position. In this position it is not in contact against drive arms 15, 16. Pressing device 1 is placed against a pipe join in such a way that it lies between pressing jaws 21, 22. The pipe join has a pipe end region 23 over which a press fitting 24 is partially slid. This is apparent in particular from FIG. 2. Press fitting 24 has a cylindrical segment 25 having a constriction 26 that is centrally located and serves as a stop for pipe end region 23. At the free ends, press fitting 24 has outwardly convex annular beads 27, 28 into the interior of each of which an elastomeric sealing ring 29, 30 is placed. Pressing jaws 21, 22 rest at the level of annular bead 28 on the right side in FIG. 2.

For the pressing operation, the electric motor (not depicted) is switched on so that the drive head moves upward. As a result, in the first part of a takeup phase, drive rollers 9, 10 first come into contact against the shallowly inclined segments of drive surfaces 19, 20. As the upward movement continues, drive arms 15, 16 are spread apart, with the result that in the second part of the takeup phase, jaw arms 17, 18 approach one another and pressing jaws 21, 22 come into contact against annular bead 28. As drive head 8 moves farther upward, the actual pressing operation begins, in which annular bead 28 and the immediately adjacent region of cylindrical segment 25 are plastically deformed radially inward, pipe end region 23 also being plastically compressed radially inward during the last stage of pressing. In this context, drive rollers 9, 10 travel into the region between drive arms 15, 16, where drive surfaces 19, 20 are at only a very narrow angle to one another, i.e. are very steeply inclined.

Figure 3:
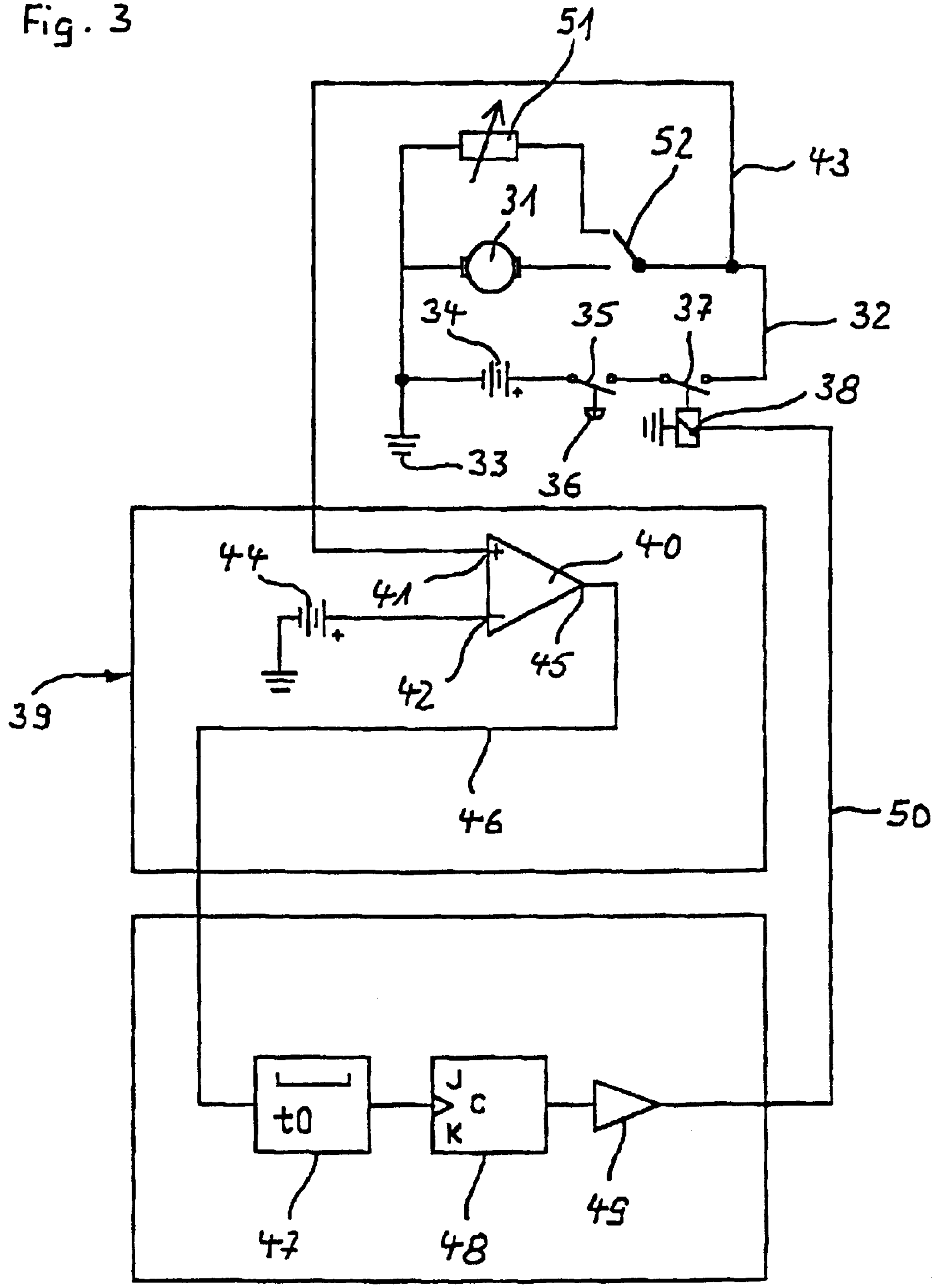
FIG. 3 shows a circuit for performing a voltage comparison with the pressing device as shown in FIGS. 1 and 2.

FIG. 3 shows the electrical circuitry of pressing device 1. Its electric motor 31 is arranged in a main circuit 32 that is grounded at 33 and that is supplied with a specific voltage from a rechargeable battery 34. Also arranged in main circuit 32 is a switch 35 that is actuated via a switch-on button 36. The purpose of switch-on button 36 is to switch electric motor 31 on and off. Provided in series with this switch 35 is a second switch 37 that is controlled by a relay 38.

The circuit includes a voltage comparison device 39 with an analog comparator 40. Comparator 40 has two inputs 41, 42, first input 41 being connected via a line 43 to main circuit 32 and picking off its voltage. A limit voltage which is generated by an auxiliary battery 44 is applied to second input 42. The two voltages are compared in comparator 40, which sets its output 45 to logical "zero" if the voltage at battery 34 is less than the limit voltage at second is input 42, whereas it sets the output to logical "one" if the voltage at first input 41 is once again greater than the limit voltage at second input 42.

Output 45 is connected via a line 46 to a timing element 47 which is followed by a memory 48 and a relay driver 49. The latter's output is connected via a line 50 to relay 38 of second switch 37.

A potentiometer 51 is arranged in parallel with electric motor 31. Electric motor 31 can be bypassed by way of a two-way switch 52, so that a load cycle in main circuit 32 can be created by way of potentiometer 51.

The operation of the circuit will be explained with reference to the graphs of FIGS. 4 and 5. Both graphs depict a voltage curve 53, 54 as a function of time t; voltage curve 53 occurs when the charge state of battery 34 is sufficient, and voltage curve 54 when the charge state is no longer sufficient.

A prepressing operation using pressing device 1 is initiated by pushing switch-on button 36, which causes first switch 35 to close. Second switch 37 is then—in contradiction to the graphic depiction in FIG. 3—in the closed state, and two-way switch 52—in contradiction to the graphic depiction—is switched over in such a way that actuation of switch-on button 36 causes electric motor 31 to start. Since in this phase the moving parts of electric motor 31, as well as the drive spindle and drive head 8, must be accelerated, the current in main circuit 32 rises sharply. This produces a definite voltage drop to a level below limit voltage 55, which is present at second input 42 of comparator 40 and is kept constant over the entire pressing cycle. When the voltage falls below limit voltage 55, comparator 40 switches from logical "one" to logical "zero." Timing element 47 is activated via line 46.

Timing element 47 runs for no more than a constant time interval t0. If, and as soon as, the voltage in main circuit 32 present at first input 41 of comparator 40 rises again, during this time interval t0, above limit voltage 55, output 45 is set to logical "one." This causes timing element 47 once again to be set to zero. This situation is depicted in FIG. 4. It is evident that within time interval t0, and specifically after a time tE, the voltage has recovered to the point that voltage curve 53 is once again above limit voltage 55. The voltage recovery is associated with a drop in current, because the aforementioned moving parts have been accelerated to the idle speed of electric motor 31, and a takeup phase then occurs until drive rollers 9, 10 come into contact against drive arms 15, 16 of pivot levers 13, 14, and pivot levers 13, 14 have pivoted to the extent that they come into contact against press fitting 24. The actual pressing operation then begins, resulting again in a high current consumption which once again causes the voltage in main circuit 32 to drop below limit voltage 55, as shown by the graph in FIG. 4. This voltage drop does not, however, cause timing element 47 to be initiated again, even though a different logic state is once again present at output 45 of comparator 40.

Figure 5:
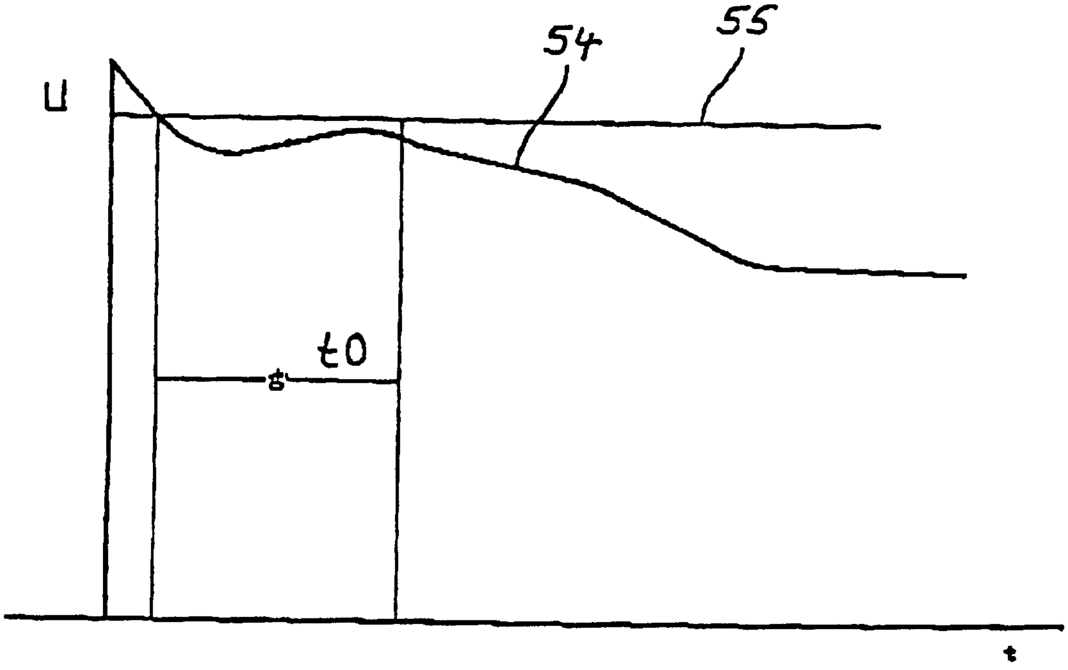
FIG. 5 shows a graph of the voltage curve for the pressing device as shown in FIGS. 1 through 3 when the battery charge state is no longer sufficient.

It is apparent from FIG. 5 that after the first voltage drop, the voltage is no longer recovering sufficiently due to an insufficient charge state. Within time interval t0, voltage curve 54 remains below limit voltage 55, so that the logic state at output 45 of comparator 40 does not change. Once time interval t0 has elapsed, timing element 47 triggers memory 48, which activates relay driver 49 and thereby drives relay 38. As a result, second switch 37 is opened and electric motor 31 is thus shut off. Time interval t0 is sufficiently short that the shutoff occurs already in the startup phase, or at the latest in the takeup phase, in which pressing jaws 21, 22 have not yet come into contact against press fitting 24. The graph in FIG. 5 shows, after the time interval t0 has elapsed, a voltage curve that would occur if electric motor 31 were not shut off, i.e. if the pressing operation on press fitting 24 were performed.

Limit voltage 55 is set sufficiently high that the shutoff of electric motor 31 on the basis of voltage curve 54 occurs when battery 34 can still supply some residual energy. This residual energy can be used to generate visible or audible signals, and to return electric motor 31 to its starting position. In addition, a corresponding circuit can be used to make restarting of electric motor 31 possible only when battery 34 has been replaced with a fresh one.

Figure 6:
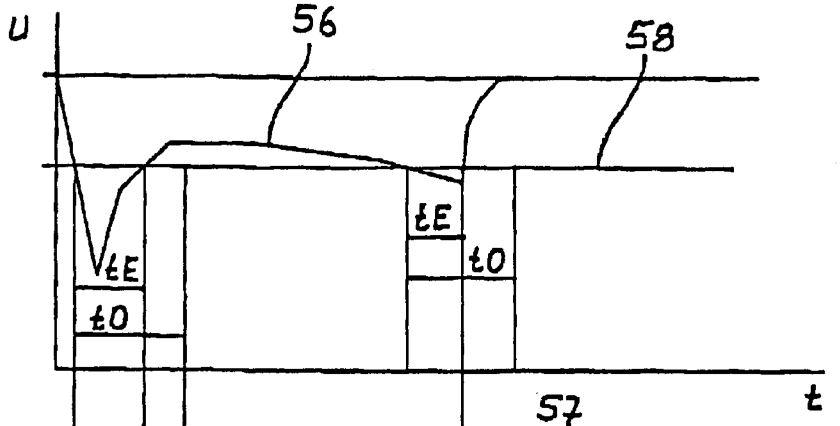
FIG. 6 shows a graph with a different voltage curve for a pressing device when the battery charge state is sufficient.
Figure 7:
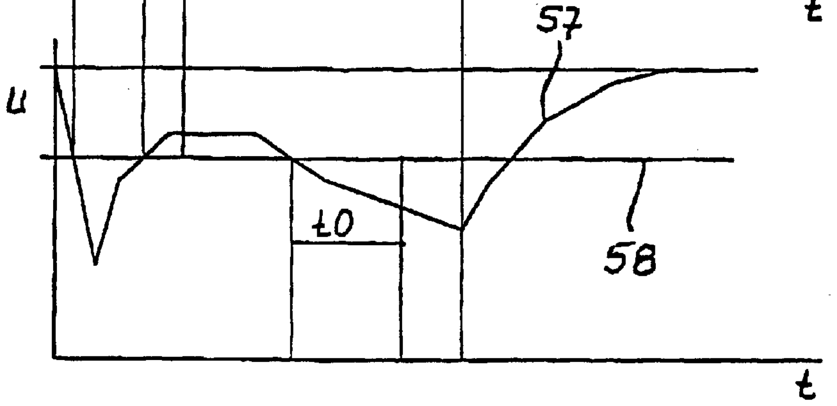
FIG. 7 shows a graph with a voltage curve for this pressing device when the battery charge state is no longer sufficient.

FIGS. 6 and 7 illustrate further possible voltage curves 56, 57 over time t; here again, a constant limit voltage 58 is applied. Both cases are characterized, once again, by a voltage drop due to the acceleration of the moving parts to the idle speed of electric motor 31 and a subsequent voltage recovery, and by the fact that the voltage recovery and thus the rise in value above limit voltage 58 occur within time interval t0, i.e. time tE between the drop in voltage below limit voltage 58 and the subsequent rise above limit voltage 58 is shorter than the predefined time interval t0. As already described above in detail, the result of this is that timing element 47 is reset, and electric motor 31 continues to run.

Figure 4:
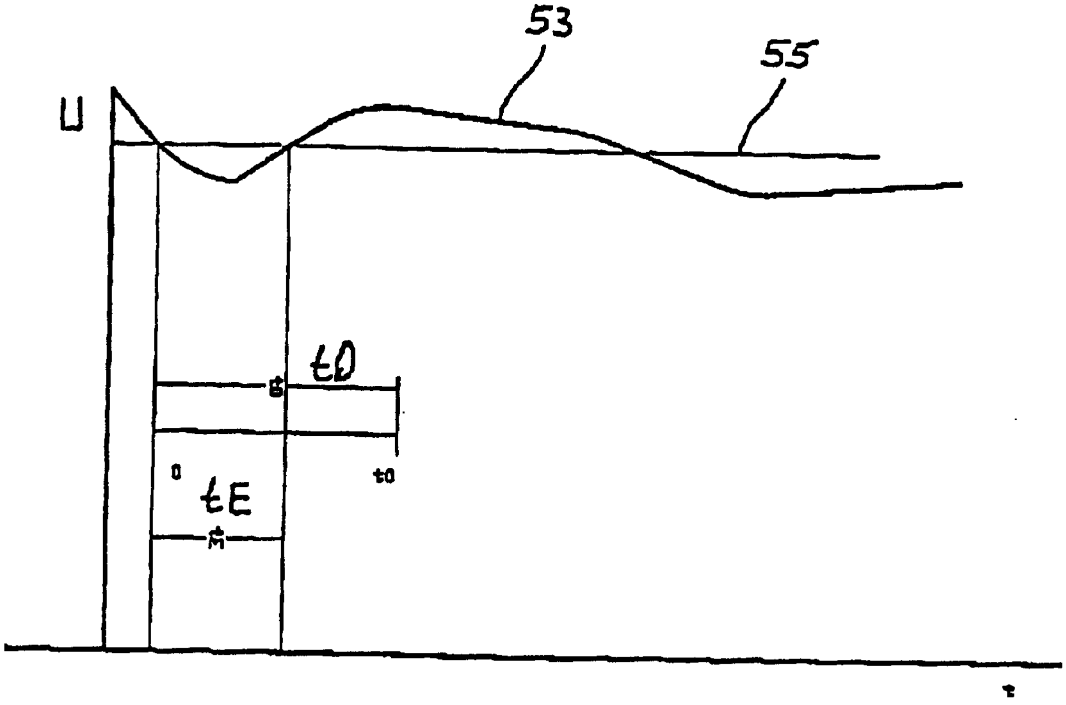
FIG. 4 shows a graph of the voltage curve for the pressing device as shown in FIGS. 1 through 3 when the battery charge state is sufficient.

In contrast to the situations depicted in FIGS. 4 and 5, however, the circuit in FIG. 3 is not deactivated. The result of this is that when the voltage once again falls below limit voltage 58 and the state at output 45 thus changes from logical "one" to logical "zero," timing element 47 is started. In the case of voltage curve 53 shown in FIG. 6, the decrease below limit voltage 58 occurs in a late phase, and lasts for only a short time period tE until the voltage once again rises above limit voltage 58. This happens at the beginning of the actual pressing operation. Time period tE is shorter than time interval t0, with the result that timing element 47 is once again reset.

FIG. 7 shows voltage curve 57 when battery 34 no longer has sufficient charge. This is immediately evident from the much greater voltage drop after electric motor 31 is started, although even here the recovery to a value above limit voltage 58 still occurs within time interval t0, i.e. electric motor 31 is not caused to shut off. The voltage drop which then resumes happens much sooner than in the case of voltage curve 56, and lasts for the entire time interval t0. In this case, however, the circuit shown in FIG. 3 is modified in such a way that switch 37 is not opened yet, but instead the pressing operation is completed, since the charge state of battery 34, as indicated by voltage curve 57 during the first time interval t0, is better than in the situation shown in FIG. 5. Only after pressing has been completed, and electric motor 31 has been shut off via first switch 35, does the opening of second switch 37 occur, and with it an inhibition that is not canceled until battery 34 has been replaced with a fresh one.

Figure 8:
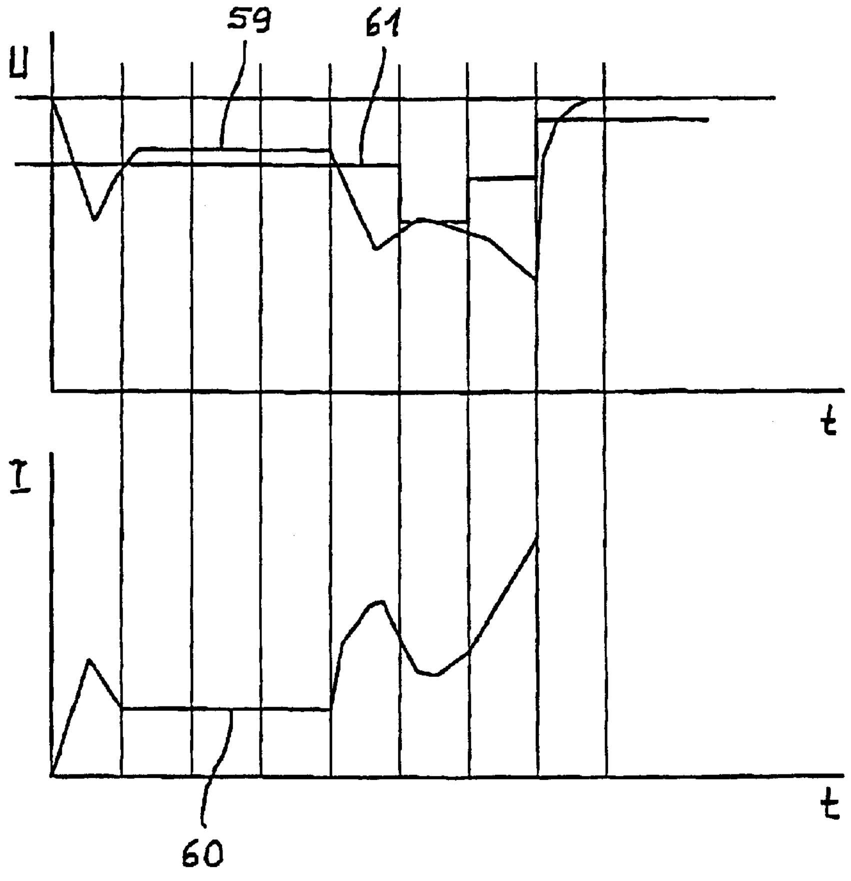
FIG. 8 shows a combined graph with a voltage and current curve when the battery charge state is no longer sufficient.

In FIG. 8, voltage U (at the top) and current I (at the bottom) are plotted against time t, resulting in voltage curve 59 and current curve 60. Also plotted in the top part of FIG. 8 is a limit voltage 61 that, in contrast to limit voltages 55, 58 in FIGS. 4 through 7, is initially constant but then is set one step lower and then raised again two steps, so that it is higher at the end than at the beginning. Limit voltage 61 is thus modifiable, this being accomplished automatically and in time-dependent fashion by way of a corresponding circuit in the region of auxiliary battery 44.

An additional change results from the fact that the entire time sequence is divided into individual and identical time segments, as indicated by the vertical lines. Within a time segment, a check is made as to whether the voltage indicated by voltage curve 59 is below limit voltage 61. If so, a check is simultaneously made as to whether the voltage has once again risen above limit voltage 61, or has not. In the former case, sufficient charge is present in battery 34, and second switch 37 remains open. In the latter case, several possibilities are available. For example, second switch 37 can be opened immediately, thus shutting off electric motor 31 so that a pressing operation cannot even be started. Or electric motor 31 can be reset using residual energy still present in battery 34. Both options are suitable, in particular, if the insufficient voltage recovery is ascertained within the first time segments (and in this case within the first time segment), and the risk therefore exists of an incomplete pressing operation and/or damage to battery 34. If a deficient voltage recovery is ascertained only in later time segments, provision can also be made, by way of a corresponding circuit, for the pressing operation to be completed anyway and only then for electric motor 31 to be inhibited for further pressing cycles.

In the situation illustrated, the characteristic voltage drop takes place in the first time segment. The voltage recovery, and thus the rise again above limit voltage 61, coincides with the end of the first time segment, so that here again it is assumed that the charge state is still sufficient, and electric motor 31 is not shut off. In the fifth time segment, the voltage once again falls below limit voltage 61. The subsequent recovery is so weak, however, that limit voltage 61 is not reached again. Even in the next (sixth) segment, the voltage is still below limit voltage 61 even though the latter is greatly reduced there. It is exceeded only briefly within this time segment. This is followed by a further voltage drop with an elevated limit voltage 61, so that here again an insufficient charge state is ascertained. In the eighth and last time segment, the voltage rises again above limit voltage 61. Since the voltage was below limit voltage 61 at the ends of each of the three previous time segments, the conclusion remains that the charge in battery 34 is insufficient at least for the next pressing cycle, and electric motor 31 is inhibited, at the latest after completion of the pressing cycle in progress, by opening second switch 37.

The check of the charge state of battery 34 can also take place without switching on electric motor 31. For this purpose, two-way switch 52 is brought into the position shown, so that the current flow passes through potentiometer 51. With this potentiometer 51 it is possible to generate a current curve and thus also a voltage curve like those that occur during an actual pressing operation. For testing the charge state, it is sufficient if the load impressed by potentiometer 51 is simulated only until the takeup phase; in other words, only a characteristic voltage drop with a subsequent recovery is generated. The circuit shown in FIG. 3 then functions in exactly the same way as described in conjunction with FIG. 4, i.e. a check is made as to whether, within time interval t0, the voltage that has dropped below limit voltage 55 does or does not again exceed limit voltage 55 as it recovers. In this context, reference is made to the description of the exemplary embodiment illustrated in FIG. 4.

Using potentiometer 51, it is possible to perform the check of the charge state of battery 34 before electric motor 31 is switched on, to ensure that the subsequent pressing operation can be performed. There also exists the possibility, however, of making the check during pressing, if electric motor 31 is taken out of the circuit shown in FIG. 3 and is arranged in a separate circuit. A circuit modified in this fashion as compared to FIG. 3 is then simply a test circuit for ascertaining the charge state of battery 34.

If battery 34 can be separated from pressing device 1 because it is connected to pressing device 1 only via a line, the test circuit can be accommodated in the housing of battery 34, so that the suitability of battery 34 for performing pressing cycles can be determined even before it is connected to pressing device 1. A corresponding display then provides information regarding the charge state. After connection to the actual pressing device 1, the measures already described in detail above can be taken if an insufficient charge state has been ascertained, i.e. either inhibition of electric motor 31 if the insufficient charge state is already ascertained before it is switched on; or shutoff during the pressing operation or termination of the pressing operation followed by inhibition of electric motor 31, if the insufficient charge state is determined during pressing and the limit voltage and time interval t0 are set in such a way that when that determination is made, sufficient residual energy for completion of the pressing cycle is still present. A visible or audible indication informs the operator that a further pressing cycle should not or cannot be started.

The limit voltage and time interval t0 should be adapted in terms of what is selected as a consequence of ascertaining the insufficient charge state. If the intention is still to complete the pressing cycle, the limit voltage should be higher (and/or time interval t0 shorter) than in the case in which electric motor 31 is immediately inhibited.

What is claimed is:

1. A handleable working device, comprising:

a pressing device (1) having a pressing tool (23, 14); an electric motor (31) operatively associated with said pressing device for driving the tool (12, 13);

a battery (34) operatively associated with said electric motor for supplying energy to said electric motor (31); and le;2qa control device operatively associated with said electric motor and with said battery, said control device includes a voltage comparison element (39) comparing the voltage of said battery with a limit voltage (55, 58, 61), said control device generating an attention signal and/or limiting activation of said electric motor (31) if the voltage comparison element establishes that the battery voltage is equal to or less than the limit voltage (55, 58, 61), and said control device further includes an interval element (47) having at least one storable interval (t0) and a load element (31, 51), so that a voltage curve (53, 54, 56, 57, 59) with a varying battery voltage is generated during a load cycle, said interval element (47) being activated, during a predetermined interval in which the battery voltage is decreasing, at least once after said load element (31, 51) is activated so that the voltage comparison element may determine whether the battery voltage during the predetermined interval at least attains the limit voltage.

2. The working device as defined in claim 1, wherein the load element is the electric motor (31).

3. The working device as defined in claim 1, wherein the load element is an adjustable resistor (51).

4. The working device as defined in claim 3, wherein the resistor (51) is arranged electrically in parallel with the electric motor (31) and by way of a two-way switch (52), the resistor (51) and the electric motor (31) can be selected as the load element.

5. The working device as defined in claim 1, wherein the voltage comparison element (39) includes an analog comparator (40) to which the battery voltage and the limit voltage (55, 58, 61) are applied.

6. The working device as defined in claim 1, wherein the interval element is a timing element (47).

7. The working device as defined in claim 1, wherein the interval element (47) is activated when the load element (31, 51) is activated.

8. The working device as defined in claim 1, wherein the voltage comparison element (39) performs the voltage comparison after the load element (31, 51) is activated, and the interval element (47) is activated only when it is determined that the battery voltage has reached, or falls below or exceeds, a second limit voltage (55, 58, 61).

9. The working device as defined in claim 8, wherein the first and the second limit voltages (55, 58, 61) are identical.

10. The working device as defined in claim 1, wherein said load element (31, 51) has a start-up phase during which the voltage of said battery drops and a subsequent voltage recovery phase; and said interval element (47) is activated during the start-up phase.

11. The working device as defined in claim 1, wherein said interval element (47) is activated more than once within a load cycle.

12. The working device as defined in claim 11, wherein the interval element (47) is activated only in regions of the load cycle where a voltage drop and a subsequent voltage recovery take place.

13. The working device as defined in claim 1, wherein there are a plurality of intervals the intervals are directly adjacent to one another at least over a portion of the load cycle.

14. The working device as defined in claim 11, wherein a limit voltage (61) is associated with each of the intervals.

15. The working device as defined in claim 1, wherein the limit voltage is modifiable.

16. The working device as defined in claim 15, wherein a temperature measurement device is operable associated with said control device so that the limit voltage associated with a respective interval is adjusted as a function of temperature.

17. The working device as defined in claim 16, wherein the limit voltage is elevated and/or the length of the interval is shortened, if the temperature sensed by the temperature measurement device lies above or below the design temperature range.

18. The working device as defined in claims 16, wherein the temperature measurement device measures the temperature of the battery (34).

19. The working device as defined in claim 1, wherein in one load cycle at least one battery voltage is stored; and a comparison is made, in a load cycle subsequent thereto, between the previously stored battery voltage and the battery voltage in the same phase of the load cycle, a higher limit voltage being utilized, and/or the length of the interval being shortened, if the battery voltage is lower then the stored voltage.

20. The working device as defined in claim 19, wherein the comparison is made in a phase of constant load by the load element (31, 51).

21. The working device as defined in claim 1, wherein the control device causes the tool (13, 14) to be returned to a starting position by the electric motor (31) if the voltage comparison element determines that the battery voltage is equal to or less than the limit voltage (55, 58, 61).

22. The working device as defined in claim 1, wherein the electric motor (31) is shut off if the voltage comparison element determines that the battery voltage is equal to or less than the limit voltage (55, 58, 61).

23. The working device as defined in claim 1, wherein the load cycle is carried to completion if the voltage comparison element determines that the battery voltage is equal to or less than the limit voltage, and the electric motor (31) is inhibited until the battery (34) is replaced.

24. The working device as defined in claim 1, wherein the electric motor (31) is inhibited after a limited number of load cycles until the battery (34) is replaced.

25. A method for determining the charge state of a battery operated pressing device, comprising the steps of:

a) providing a handleable working device comprising a pressing device and an electric motor operably associated with the pressing device for operating the pressing device, and a battery operably associated with the electric motor for supplying energy to the electric motor for operating the electric motor;

b) providing a control device in operable association with the battery and the electric motor, the control device having a voltage comparison element for comparing the voltage of the battery to a limit voltage;

c) applying a load to the battery and thereby causing the voltage generated by the battery to vary;

d) comparing with the voltage comparison element the voltage of the battery with the limit voltage during a predetermined interval in which the load is applied; and e) generating an attention signal or limiting actuation of the electric motor if the battery voltage does not at least achieve the limit voltage during the predetermined interval and allowing the electric motor to operate and thereby operating the pressing device if the battery voltage at least achieves the limit voltage during the predetermined interval.

* * * * *